(12) United States Patent
Djefel (10) Patent No.: US 11,085,292 B2
(45) Date of Patent: Aug. 10, 2021

(54) AVOIDING GEOLOGICAL BODIES THAT ARE HAZARDS TO DRILLING OPERATIONS

(71) Applicant: HALLIBURTON ENERGY SERVICES, Houston, TX (US)

(72) Inventor: Bronwyn Michelle Djefel, Spring, TX (US)

(73) Assignee: HALLIBURTON ENERGY SERVICES, Houston, TX (US)

(*) Notice: Subject to any disclaimer, the term of this patent is extended or adjusted under 35 U.S.C. 154(b) by 371 days.

(21) Appl. No.: 16/339,980

(22) PCT Filed: Nov. 17, 2016

(86) PCT No.: PCT/US2016/057039
§ 371 (c)(1),
(2) Date: Apr. 5, 2019

(87) PCT Pub. No.: WO2018/093344
PCT Pub. Date: May 24, 2018

(65) Prior Publication Data
US 2020/0040724 A1    Feb. 6, 2020

(51) Int. Cl.
E21B 49/00        (2006.01)
E21B 44/00        (2006.01)
E21B 7/04         (2006.01)
G01V 3/20         (2006.01)

(52) U.S. Cl.
CPC ............... *E21B 49/00* (2013.01); *E21B 7/04* (2013.01); *E21B 44/00* (2013.01); *G01V 3/20* (2013.01)

(58) Field of Classification Search
CPC . E21B 49/00; E21B 7/04; E21B 44/00; E21B 47/022; E21B 47/026; E21B 7/06; G01V 3/20
See application file for complete search history.

(56) References Cited

U.S. PATENT DOCUMENTS

| 7,093,672 B2* | 8/2006 | Seydoux | G01V 3/28 |
| | | | 175/24 |
| 7,778,811 B2* | 8/2010 | Kelfoun | E21B 47/022 |
| | | | 703/10 |
| 2012/0188091 A1* | 7/2012 | Calleja | G01V 1/40 |
| | | | 340/854.1 |

(Continued)

FOREIGN PATENT DOCUMENTS

| WO | 2012135803 A2 | 10/2012 |
| WO | 2016053330 A1 | 4/2016 |

OTHER PUBLICATIONS

International Search Report and Written Opinion; PCT Application No. PCT/US2016/057039; dated Nov. 17, 2016.

(Continued)

*Primary Examiner* — Regis J Betsch
*Assistant Examiner* — Jeremy A Delozier
(74) *Attorney, Agent, or Firm* — Polsinelli PC (57) ABSTRACT

Systems and methods for avoiding discrete 3D geological bodies that are hazards to drilling operations by identifying each 3D geological body near a well-path, defining the extents of each 3D geological body relative to the well-path, and displaying the extents of each 3D geological body relative to the well-path.

20 Claims, 5 Drawing Sheets

(56) References Cited

U.S. PATENT DOCUMENTS

| | | | | |
|---|---|---|---|---|
| 2014/0116776 A1* | 5/2014 | Marx | ............... | E21B 47/00 |
| | | | | 175/24 |
| 2015/0292266 A1* | 10/2015 | Johnson | ............... | G05B 13/04 |
| | | | | 175/24 |
| 2017/0097441 A1* | 4/2017 | Eiskamp | ............... | E21B 47/022 |

OTHER PUBLICATIONS

"Structural and Stratigraphic Dip Computation and Analysis"; H02937; 2008.

"Access-Dependent Active Magnetic-Ranging Systems"; H05637; 2014.

"Wireline and LWD Borehole Image Log Dip and Azimuth Uncertainty"; Tegwyn Perkins et al., SPWLA 50th Annual Logging Symposium, Jun. 21-24, 2009.

"New Logging While Drilling Ranging and Formation Evaluation Technique"; M. Bittar, H. Wu; 2013.

"Real-time Proactive Optimal Well Placement Using Geosignal and Deep Images"; OTC 201894; Michael Bittar et al.; 2010.

WellSpot™ Active Magnetic Ranging Service Leads to a Successful Relief Well Interception of a Blowout Well in Indonesia; H011682; 2015.

Overcoming Uncertainties Through Advanced Real-Time Wellbore Positioning in Kuwait: A Sucees Story; SPE 128522; Saud Jumah et al.; 2010.

* cited by examiner

AVOIDING GEOLOGICAL BODIES THAT ARE HAZARDS TO DRILLING OPERATIONS

CROSS-REFERENCE TO RELATED APPLICATIONS

This application is a national stage entry of PCT/US2016/057039 filed Nov. 17, 2016, said application is expressly incorporated herein in its entirety.

FIELD OF THE DISCLOSURE

The present disclosure generally relates to systems and methods for avoiding geological bodies that are hazards to drilling operations. More particularly, the present disclosure relates to avoiding discrete three-dimensional (3D) geological bodies that are hazards to drilling operations by identifying each 3D geological body near a well-path, defining the extents of each 3D geological body relative to the well-path, and displaying the extents of each 3D geological body relative to the well-path.

BACKGROUND

Geosteering solutions are very important for optimizing well placement while drilling, especially for landing the reservoir or drilling through the reservoir. Conventional geosteering is usually based on a geological model constructed from seismic imaging and offset well logs. Vertical offset wells are commonly drilled to provide stratigraphic information from mud and well-logging, such as acoustic, resistivity, gamma ray, nuclear, nuclear magnetic resonance, and fluid sampling tools. This type of geophysical data may be acquired during logging while drilling (LWD) operations, or after with wireline tools.

Current, real-time geosteering techniques can image formation properties by inverting resistivity data for layered earth one-dimension (1D) resistivity models. One such technique uses distance to bed boundary (DTBB) inversion from deep LWD resistivity measurements to produce a "curtain plot," which is a simple visualization of stitched layered earth 1D resistivity models that can be interpreted for geological structure and geosteering decisions. Curtain plots may contain uncertainties, however. Such uncertainties may include, for example: i) a lack of two-dimensional (2D) and 3D model complexity at each measured depth because the earth model is assumed to be locally in only 1D; and ii) non-unique resistivity inversion, implying multiple earth models may satisfy the same resistivity data. A curtain plot captures a possible solution, and reconciling differences between the curtain plot and the geological model (especially in the absence of other LWD data) is a common challenge in geosteering.

BRIEF DESCRIPTION OF THE DRAWINGS

The present disclosure is described below with references to the accompanying drawings in which like elements are referenced with like reference numerals, and in which.

DETAILED DESCRIPTION OF THE PREFERRED EMBODIMENTS

The present disclosure overcomes one or more deficiencies in the prior art by identifying each 3D geological body near a well-path, defining the extents of each 3D geological body relative to the well-path, and displaying the extents of each 3D geological body relative to the well-path to avoid the 3D geological bodies that are hazards to drilling operations.

The subject matter of the present disclosure is described with specificity, however, the description itself is not intended to limit the scope of the disclosure. The subject matter thus, might also be embodied in other ways, to include different structures, steps and/or combinations similar to and/or fewer than those described herein, in conjunction with other present or future technologies. Moreover, although the term "step" may be used herein to describe different elements of methods employed, the term should not be interpreted as implying any particular order among or between various steps herein disclosed unless otherwise expressly limited by the description to a particular order. While the present disclosure may be described with respect to the oil and gas industry, it is not limited thereto and may also be applied in other industries (e.g. drilling water wells) to achieve similar results.

Method Description

Figure 1A:
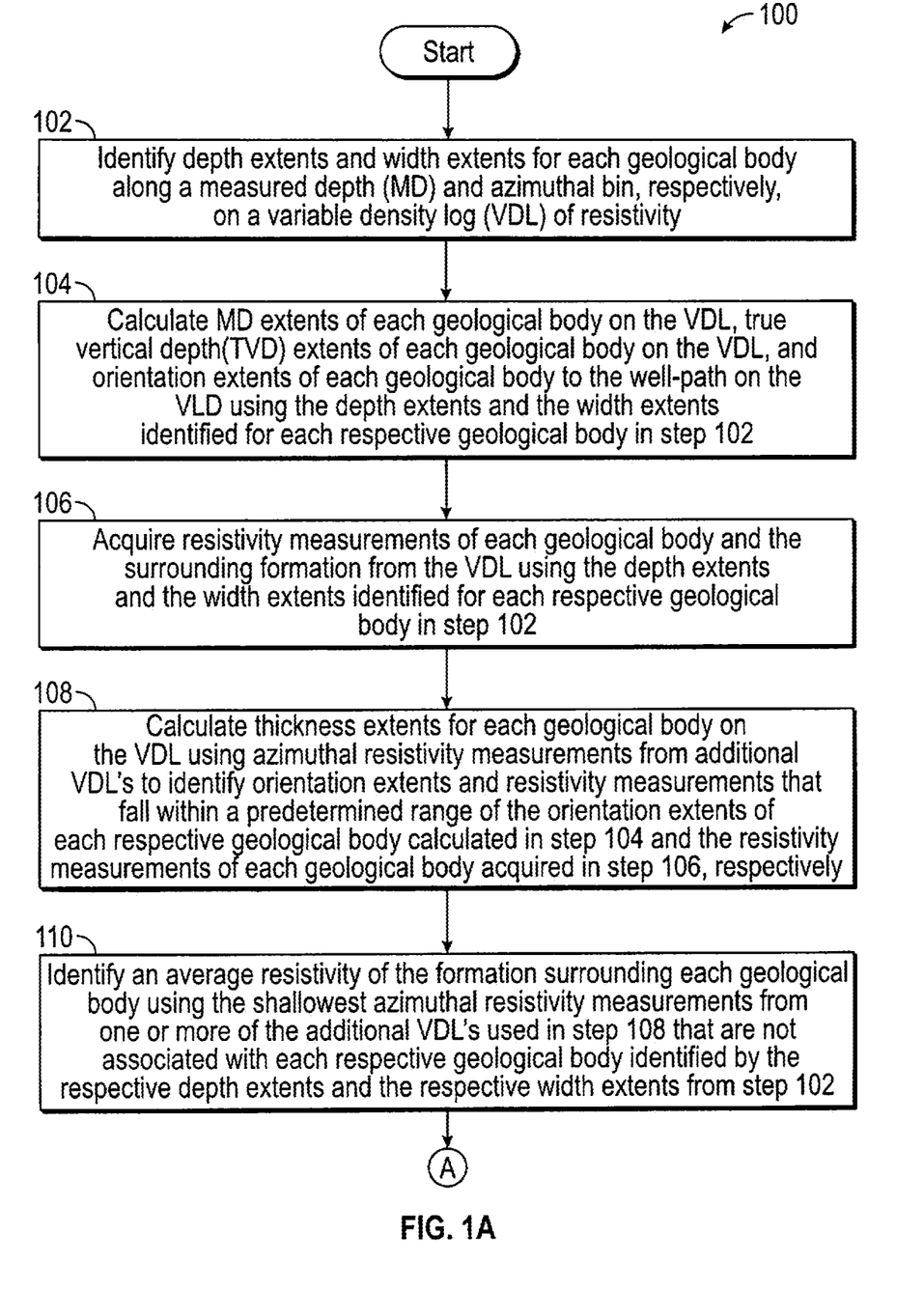
FIGS. 1A-1B are a flow diagram illustrating one embodiment of a method for implementing the present disclosure.
Figure 1B:
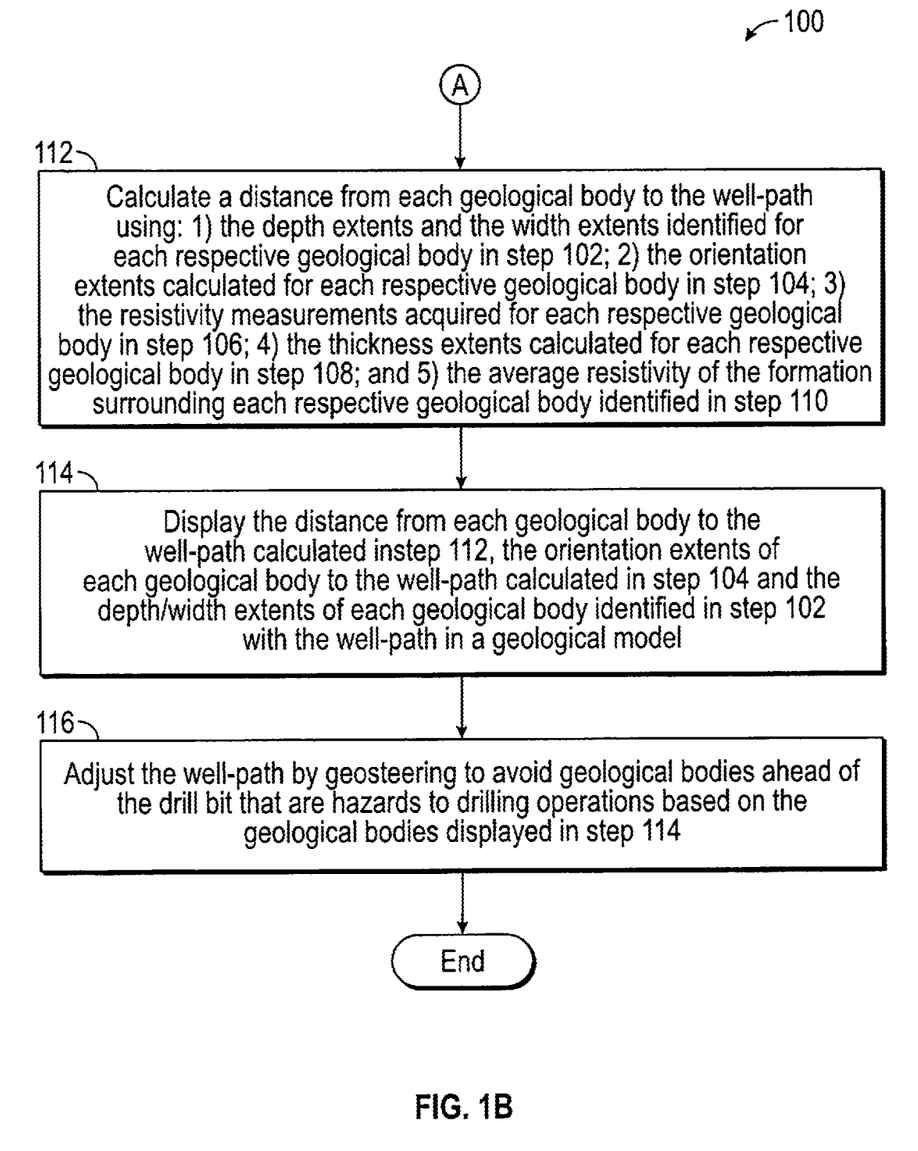

Referring now to FIGS. 1A-1B, a flow diagram illustrates one embodiment of a method 100 for implementing the present disclosure.

Figure 2:
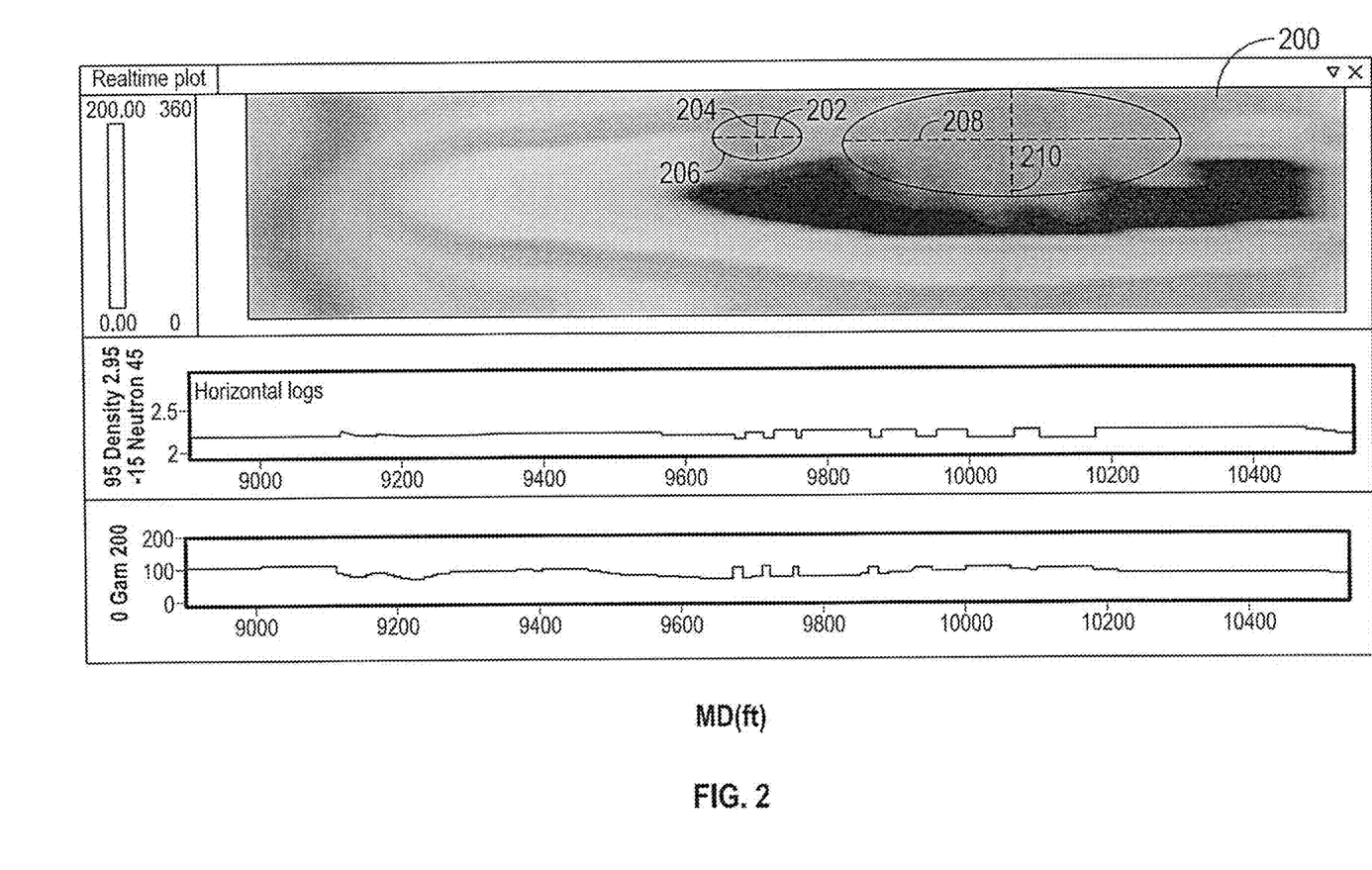
FIG. 2 is a variable density log of resistivity illustrating step 102 in FIG. 1A.
Figure 5:
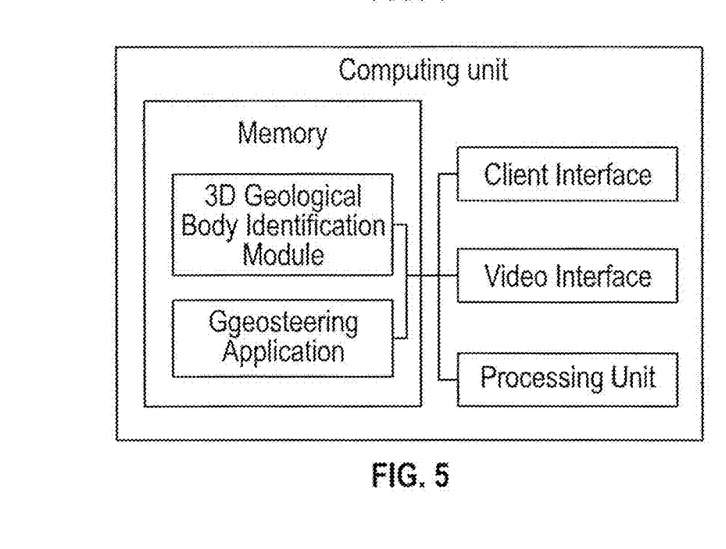
FIG. 5 is a block diagram illustrating one embodiment of a computer system for implementing the present disclosure.

In step 102, depth extents and width extents for each geological body are identified along a measured depth (MD) and azimuthal bin, respectively, on a variable density log (VDL) of resistivity using the client interface and/or the video interface described further in reference to FIG. 5. A VDL is a type of offset well-log representing data taken from logging tools in a high-angle, horizontal active well. In FIG. 2, a VDL of resistivity 200 illustrates the identification of depth extents 202 and width extents 204 for a geological body 206 by marking the same on the VDL as these extents are perceived from the resistivity data. Once the depth extents and the width extents are marked, a 2D boundary for the geological body may be displayed. The 2D boundary for the geological body 206 here forms an ellipse. In the same manner, depth extents 208 and width extents 210 are identified for another geological body 212. In FIG. 2, the VDL of resistivity 200 represents resistivity data taken from a section of the high-angle, horizontal active well.

In step 104, MD extents of each geological body on the VDL, true vertical depth (TVD) extents of each geological body on the VDL, and orientation extents of each geological body to the well-path on the VDL are calculated using the depth extents and the width extents identified for each respective geological body in step 102 and techniques well-known in the art.

In step 106, resistivity measurements of each geological body and the surrounding formation are acquired from the VDL using the depth extents and the width extents identified for each respective geological body in step 102.

In step 108, thickness extents are calculated for each geological body on the VDL using azimuthal resistivity measurements from additional VDL's to identify orientation extents and resistivity measurements that fall within a predetermined range of the orientation extents of each respective geological body calculated in step 104 and the resistivity measurements of each geological body acquired in step 106, respectively.

In step 110, an average resistivity of the formation surrounding each geological body is identified using the shallowest azimuthal resistivity measurements from one or more of the additional VDL's used in step 108 that are not associated with each respective geological body identified by the respective depth extents and the respective width extents from step 102.

In step 112, a distance from each geological body to the well-path is calculated using: i) the depth extents and the width extents identified for each respective geological body in step 102; ii) the orientation extents calculated for each respective geological body in step 104; iii) the resistivity measurements acquired for each respective geological body in step 106; iv) the thickness extents calculated for each respective geological body in step 108; v) the average resistivity of the formation surrounding each respective geological body identified in step 110; and vi) conventional inversion techniques.

Figure 3:
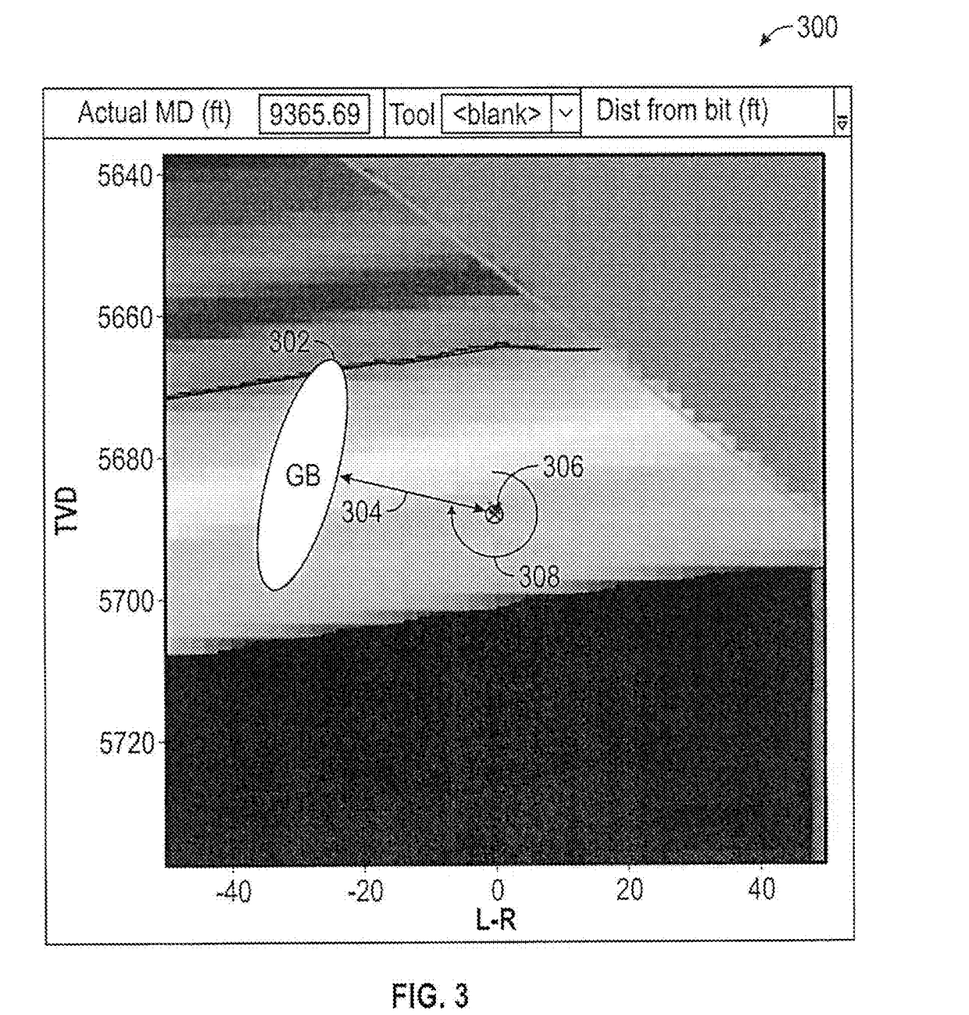
FIG. 3 is a variable density log drilling cross-section illustrating step 114 in FIG. 1A.
Figure 4:
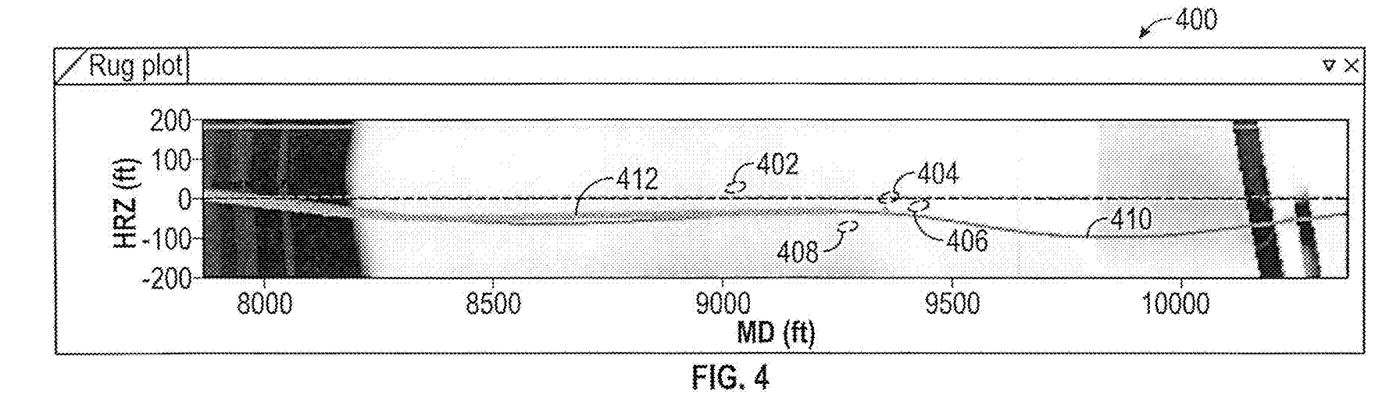
FIG. 4 is a variable density log rug plot illustrating step 114 in FIG. 1A.

In step 114, the distance from each geological body to the well-path calculated in step 112, the orientation extents of each geological body to the well-path calculated in step 104 and the depth/width extents of each geological body identified in step 102 are displayed with the well-path in a geological model using the client interface and/or the video interface described further in reference to FIG. 5. The form of the display may depend on the geological model and may include, for example, a drilling cross-section, a rug plot or a 3D map. In FIG. 3, a VDL 300 illustrates a drilling cross-section with the extents of a geological body 302, the distance 304 from the geological body 302 to a well-path 306 and the orientation 308 of the geological body 302 to the well-path 306. The VDL 300 is a geological model based on resistivity, however, may include any other type of data projected from a vertical offset well or a resistivity inversion of a traditional layered earth model. The VDL 300 illustrates the formation geology surrounding the well-path 306 (above, below, sides), which may include a geological body that represents a hazard to further drilling operations and other events. The VDL 300 may also be colored or shaded with a grey scale to further distinguish the petrophysical properties (e.g. resistivity) of the formation geology surrounding the well-path 306. The VDL 300 may also be linked to a real-time plot so as the MD of the well-path 306 increases, the drilling cross-section is updated accordingly. In FIG. 4, a VDL 400 illustrates a rug plot with the extents of each geological body 402, 404, 406, 408, the distance from each geological body to a well-path 410, the orientation of each geological body to the well-path 410 and a well bore 412. The VDL 400 is a geological model based on resistivity, however, may include any other type of data projected from a vertical offset well or a resistivity inversion of a traditional layered earth model. The VDL 400 is a variable horizontal slice through the data along the TVD of the well-path 410 in a predetermined direction (azimuth 0°-360°). The horizontal scale is MD and the vertical scale is horizontal depth on either side of the predetermined direction. In this manner, the formation geology may be illustrated on either side of the well-path 410, which may include a geological body that represents a hazard to further drilling operations and other events. The VDL 400 may also be colored or shaded with a grey scale to further distinguish the petrophysical properties (e.g. resistivity) of the formation geology surrounding the well-path 410.

In step 116, the well-path is adjusted by geosteering to avoid geological bodies ahead of the drill bit that are hazards to drilling operations based on the geological bodies displayed in step 114. The method 100 may be particularly useful for geosteering in channel sands, drilling parallel to faults and mapping off-wellbore events, such as calcites and perched water, which can assist in reservoir production estimates.

System Description

The present disclosure may be implemented through a computer-executable program of instructions, such as program modules, generally referred to as software applications or application programs executed by a computer. The software may include, for example, routines, programs, objects, components and data structures that perform particular tasks or implement particular abstract data types. The software forms an interface to allow a computer to react according to a source of input. Any geosteering software application may be used as an interface application to implement the present disclosure. The software may also cooperate with other code segments to initiate a variety of tasks in response to data received in conjunction with the source of the received data. The software may be stored and/or carried on any variety of memory such as CD-ROM, magnetic disk, bubble memory and semiconductor memory (e.g. various types of RAM or ROM). Furthermore, the software and its results may be transmitted over a variety of carrier media such as optical fiber, metallic wire and/or through any of a variety of networks, such as the Internet.

Moreover, those skilled in the art will appreciate that the disclosure may be practiced with a variety of computer-system configurations, including hand-held devices, multi-processor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof, in a computer system or other processing system.

Referring now to FIG. 5, a block diagram illustrates one embodiment of a system for implementing the present disclosure on a computer. The system includes a computing unit, sometimes referred to as a computing system, which contains memory, application programs, a client interface, a video interface, and a processing unit. The computing unit is only one example of a suitable computing environment and is not intended to suggest any limitation as to the scope of use or functionality of the disclosure.

The memory primarily stores the application programs, which may also be described as program modules containing computer-executable instructions, executed by the computing unit for implementing the present disclosure described herein and illustrated in FIGS. 1-4. The memory therefore, includes a 3D geological body identification module, which enables steps 102-112 described in reference to FIGS. 1A-1B. The 3D geological body identification module may integrate functionality from the remaining application programs illustrated in FIG. 5. In particular, any geosteering application may be used as an interface application to perform step 114 in FIG. 1B. Although geosteering interface applications may be used, the 3D geological body identification module may be used as a stand-alone application.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to, and/or presently being operated on, the processing unit. By way of example, and not limitation, the computing unit includes an operating system, application programs, other program modules, and program data.

The components shown in the memory may also be included in other removable/nonremovable, volatile/nonvolatile computer storage media or they may be implemented in the computing unit through an application program interface ("API") or cloud computing, which may reside on a separate computing unit connected through a computer system or network. For example only, a hard disk drive may read from or write to nonremovable, nonvolatile magnetic media, a magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like. These and other input devices are often connected to the processing unit through the client interface that is coupled to a system bus, but may be connected by other interface and bus structures, such as a parallel port or a universal serial bus (USB).

A monitor or other type of display device may be connected to the system bus via an interface, such as a video interface. A graphical user interface ("GUI") may also be used with the video interface to receive instructions from the client interface and transmit instructions to the processing unit. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well-known.

While the present disclosure has been described in connection with presently preferred embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof.

What is claimed:

1. A method for avoiding geological bodies that are hazards to drilling operations, comprising:

calculating measured depth extents, true vertical depth extents and orientation extents of each geological body on a variable density log of resistivity using depth extents and width extents identified for each respective geological body;

calculating thickness extents for each geological body on the variable density log using azimuthal resistivity measurements from additional variable density logs of resistivity to identify orientation extents and resistivity measurements that fall within a predetermined range of the orientation extents and the resistivity measurements, respectively, of each geological body;

calculating a distance from each geological body to a well-path using i) the depth extents and the width extents identified for each respective geological body; ii) the orientation extents for each respective geological body; iii) the resistivity measurements for each respective geological body; iv) the thickness extents for each respective geological body; v) an average resistivity of a formation surrounding each respective geological body; and a computer processor;

displaying a geological model with the distance from each geological body to the well-path, the orientation extents of each geological body to the well-path, the depth extents of each geological body, the width extents of each geological body and the well-path; and geosteering the drilling operations to adjust the well-path and avoid each geological body in the display that is a hazard to the drilling operations.

2. The method of claim 1, wherein the depth extents and the width extents are identified for each geological body along a measured depth and azimuthal bin, respectively, on the variable density log.

3. The method of claim 1, wherein the resistivity measurements are acquired for each geological body and the formation surrounding each geological body from the variable density log using the depth extents and the width extents identified for each respective geological body.

4. The method of claim 1, wherein the average resistivity of the formation surrounding each respective geological body is identified using each shallowest azimuthal resistivity measurement from one or more of the additional variable density logs that is not associated with each respective geological body identified by the respective depth extents and the respective width extents.

5. The method of claim 1, wherein the variable density log represents data acquired from logging tools in a high-angle, horizontal, active well.

6. The method of claim 1, wherein the display represents a drilling cross-section.

7. The method of claim 6, further comprising linking the variable density log to a real-time plot so as a measured depth of the well-path increases, the drilling cross-section is updated.

8. The method of claim 1, wherein the display represents a rug-plot.

9. A non-transitory program storage device tangibly carrying computer executable instructions for avoiding geological bodies that are hazards to drilling operations, the instructions being executable to implement:
- calculating measured depth extents, true vertical depth extents and orientation extents of each geological body on a variable density log of resistivity using depth extents and width extents identified for each respective geological body;
- calculating thickness extents for each geological body on the variable density log using azimuthal resistivity measurements from additional variable density logs of resistivity to identify orientation extents and resistivity measurements that fall within a predetermined range of the orientation extents and the resistivity measurements, respectively, of each geological body;
- calculating a distance from each geological body to a well-path using i) the depth extents and the width extents identified for each respective geological body; ii) the orientation extents for each respective geological body; iii) the resistivity measurements for each respective geological body; iv) the thickness extents for each respective geological body; and v) an average resistivity of a formation surrounding each respective geological body;
- displaying a geological model with the distance from each geological body to the well-path, the orientation extents of each geological body to the well-path, the depth extents of each geological body, the width extents of each geological body and the well-path; and
- geosteering the drilling operations to adjust the well-path and avoid each geological body in the display that is a hazard to the drilling operations.

10. The program storage device of claim 9, wherein the depth extents and the width extents are identified for each geological body along a measured depth and azimuthal bin, respectively, on the variable density log.

11. The program storage device of claim 9, wherein the resistivity measurements are acquired for each geological body and the formation surrounding each geological body from the variable density log using the depth extents and the width extents identified for each respective geological body.

12. The program storage device of claim 9, wherein the average resistivity of the formation surrounding each respective geological body is identified using each shallowest azimuthal resistivity measurement from one or more of the additional variable density logs that is not associated with each respective geological body identified by the respective depth extents and the respective width extents.

13. The program storage device of claim 9, wherein the variable density log represents data acquired from logging tools in a high-angle, horizontal, active well.

14. The program storage device of claim 9, wherein the display represents a drilling cross-section.

15. The program storage device of claim 14, further comprising linking the variable density log to a real-time plot so as a measured depth of the well-path increases, the drilling cross-section is updated.

16. The program storage device of claim 9, wherein the display represents a rug-plot.

17. A non-transitory program storage device tangibly carrying computer executable instructions for avoiding geological bodies that are hazards to drilling operations, the instructions being executable to implement:
- calculating measured depth extents, true vertical depth extents and orientation extents of each geological body on a variable density log of resistivity using depth extents and width extents identified for each respective geological body, wherein the depth extents and the width extents are identified for each geological body along a measured depth and azimuthal bin, respectively, on the variable density log;
- calculating thickness extents for each geological body on the variable density log using azimuthal resistivity;
- calculating a distance from each geological body to a well-path using: i) the depth extents and the width extents identified for each respective geological body; ii) the orientation extents for each respective geological body; iii) the resistivity measurements for each respective geological body; iv) the thickness extents for each respective geological body; and v) an average resistivity of a formation surrounding each respective geological body;
- displaying a geological model with the distance from each geological body to the well-path, the orientation extents of each geological body to the well-path and the well-path; and
- geosteering the drilling operations to adjust the well-path and avoid each geological body in the display that is a hazard to drilling operations.

18. The program storage device of claim 17, wherein the resistivity measurements are acquired for each geological body and the formation surrounding each geological body from the variable density log using the depth extents and the width extents identified for each respective geological body.

19. The program storage device of claim 17, wherein the average resistivity of the formation surrounding each respective geological body is identified using each shallowest azimuthal resistivity measurement from one or more additional variable density logs that is not associated with each respective geological body identified by the respective depth extents and the respective width extents.

20. The program storage device of claim 17, wherein the variable density log represents data acquired from logging tools in a high-angle, horizontal, active well.

* * * * *